United States Patent [19]

Bradshaw et al.

[11] Patent Number: 4,981,283

[45] Date of Patent: Jan. 1, 1991

[54] CONNECTION FOR SERVO OPERATED VALVE

[75] Inventors: Cyril E. Bradshaw, Wheaton; Norman E. Zerndt, Palatine, both of Ill.

[73] Assignee: Eaton Corporation, Cleveland, Ohio

[21] Appl. No.: 470,004

[22] Filed: Jan. 25, 1990

[51] Int. Cl.⁵ .................... F16K 31/04; F16K 31/52
[52] U.S. Cl. ................... 251/129.11; 251/58; 251/129.12
[58] Field of Search ............ 251/129.11, 129.12, 251/58, 59, 129.2

[56] References Cited

U.S. PATENT DOCUMENTS

| | | | |
|---|---|---|---|
| 2,851,648 | 9/1958 | Reger | 251/129.12 X |
| 4,205,783 | 6/1980 | Dietsche et al. | 251/129.11 X |
| 4,432,392 | 2/1984 | Paley | 137/883 |

Primary Examiner—Rosenthal Arnold
Attorney, Agent, or Firm—R. A. Johnston

[57] ABSTRACT

An overtravel absorbing drive connection for a servo operated rotary actuated valve having an external shaft means. A crank pin provided on the external portion of the shaft means is engaged on opposite sides thereof respectively by a pair of resilient arms extending from driving hub of a connector attached to the servo output shaft. Continued rotation of the servo output shaft after closure of the valve is absorbed by resilient bending of the connector arms.

9 Claims, 1 Drawing Sheet

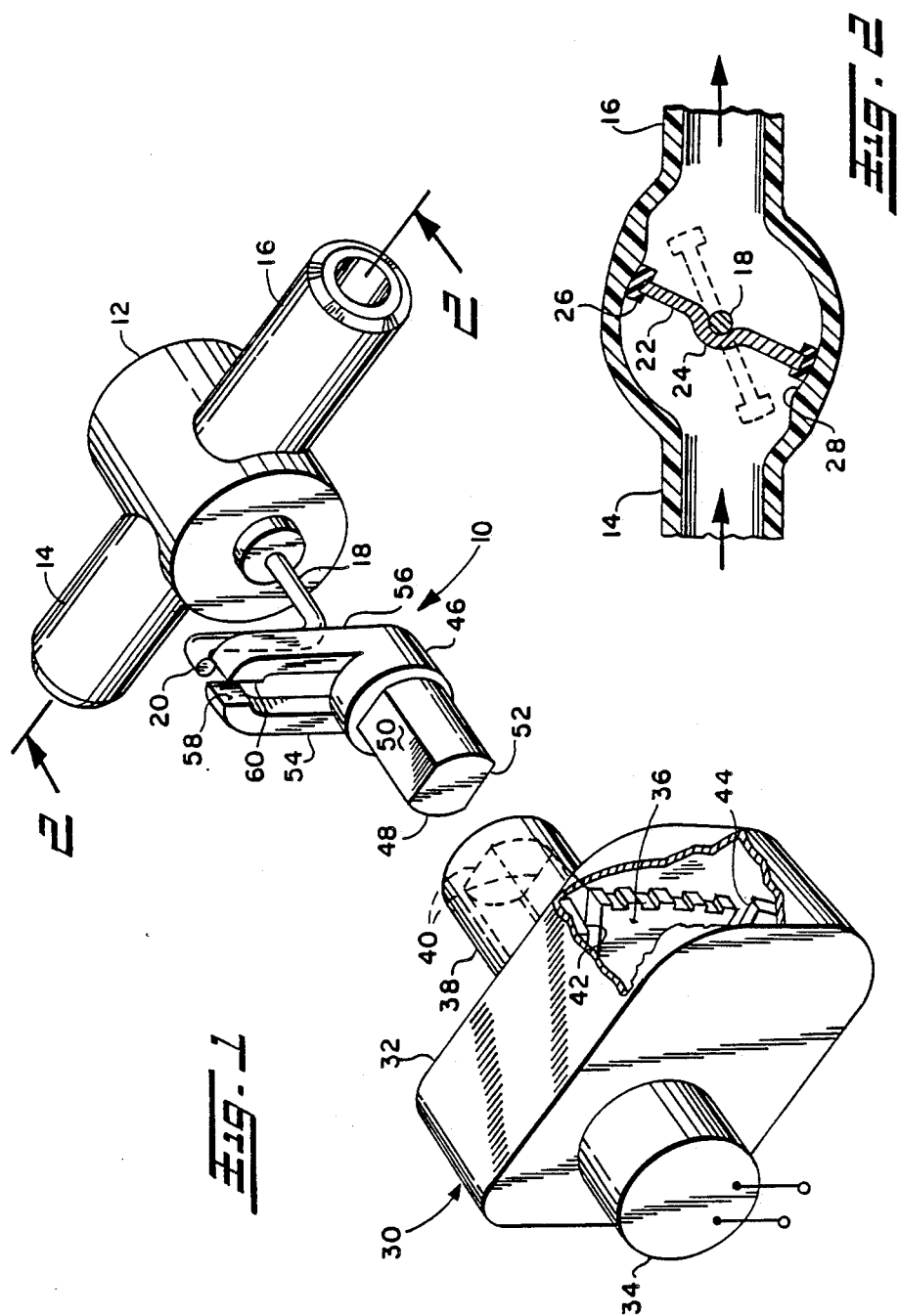

CONNECTION FOR SERVO OPERATED VALVE

BACKGROUND OF THE INVENTION

The present invention relates to valves operated by a motorized servo actuator for controlling the amount of opening and the closing of the valve. Such arrangements of controlling valve opening by a servo motor have been employed for precision control of the amount of opening of a butterfly-type water valve utilized for controlling flow of engine coolant to a vehicle passenger compartment heat exchanger. Typically, butterfly valves employed for the aforesaid application utilize an eliptically shaped disc as the valve member, which is welded to a shaft extending through the valve housing for rotary connection to the servo actuator.

Butterfly water valves of the aforesaid type typically employ a rubber seal ring molded about the periphery of the valve member to ensure positive sealing of the valve member against a valve seat provided peripherally about the valve member in the valve housing. In this regard, it has been found necessary for the servo actuator to provide a positive closing torque on the butterfly to maintain the rubber seal in contact with the valve seat to prevent leakage of the valve in the closed position. One typical construction widely employed for vehicle passenger compartment heat exchanger valves uses a weldment to attach the valve member to its pivot shaft. In order for a motorized rotary servo actuator to provide a positive closing torque on the valve shaft when the valve is in the closed position, it is necessary that the servo actuator output shaft continue rotating a minor amount after the valve has reached the closed position.

Typically, servo actuators employed for vehicle passenger compartment heat exchanger water valves utilize a small subfractional horsepower motor driving through a high ratio speed reducer to provide high torque and low rotational speed at the servo actuator output shaft. It is not uncommon for such a servo actuator to utilize a small twelve volt DC motor having a shaft speed of 3,000 rpm to drive a servo actuator employing an eight hundred to one (800:1) speed reduction ratio at its output shaft. Thus, despite the low motor torque, on the order of one or two inch ounces of torque, it will be apparent that the output torque of the servo actuator is substantial and capable of causing damage to the butterfly water valve. Experience has shown that where the servo actuator attempts to rotate the butterfly shaft after the valve member has reached the closed position, the output torque of the servo actuator is sufficient to break the welded attachment of the butterfly valve disc to its shaft within the valve.

Accordingly, it has long been desired to provide a way or means of limiting the torque applied by a servo actuator for controlling a rotary actuated valve; and, in particular, to provide sufficient control of the torque applied by the servo to the valve to prevent breaking of the connection between the valve member and its actuation shaft.

SUMMARY OF THE INVENTION

The present invention provides a connection between a motorized servo actuator and a rotary actuated valve having an external crank pin attached to the shaft for the valve member, with the crank pin engaged for rotation with the output member of the servo actuator. The output member of the servo actuator has driving surfaces provided thereon and engages a connector member having a hub with corresponding driving surfaces. A pair of spaced arms extends radially outwardly from the connector member hub in a common direction which arms engage the crank pin on the valve shaft. Rotation of the servo actuator output shaft beyond the point of closing the valve member against the valve seat within the valve assembly is absorbed by resilient deflection of the arms extending from the connector hub to thereby provide a spring force on the crank pin and a positive closing torque on the butterfly shaft. The spring rate of the resilient arms of the connector member is chosen such that the anticipated amount of overtravel does not exert a force on the crank pin sufficient to break the weldment attaching the valve member to its shaft.

The present invention thus provides a unique and novel low cost solution to the above-described problem of providing a connection between a motorized servo actuator and a rotary actuated valve for precision control of flow therethrough.

BRIEF DESCRIPTION OF THE DRAWINGS

FIG. 1 is a somewhat perspective exploded view of the connection of the present invention;

FIG. 2 is a section view taken along section-indicating lines 2—2 of FIG. 1.

DETAILED DESCRIPTION

Referring to FIG. 1, the valve connection is indicated generally at 10 and includes a water valve 12 preferably of the butterfly-type having an inlet connector 14 and an outlet connector 16 with a rotary valve actuating shaft 18 extending externally therefrom with a suitable torque receiving means, as for example the illustrated crank pin 20 formed thereon. "Alternatively a straight lever maybe attached to shaft 18 for receiving torque".

Referring to FIG. 2, the preferred form of the valve is shown as having a valve member 22, typically an eliptically-shaped disc in plan form, which is attached to the shaft 18 by any suitable expedient as for example weldment in the convoluted central portion 24 of the valve member 22. The valve member 22 preferably has an elastomeric seal rim 26 provided about the periphery thereof for sealing against a valve surface 28 disposed about the inner periphery of the valve 12. The valve member 22 is shown in solid outline in FIG. 2 in the fully closed position and in dashed outline in the open position. Similarly, in FIG. 1, the fully closed position of the crank pin 20 is shown in solid outline and in dashed outline for the open position.

Referring to FIG. 1, a servo actuator indicated generally at 30 has a case 32 having attached thereto a drive motor 34 shown mounted externally with the shaft thereof extending internally within case 32. It will be understood however that motor 34 may be completely enclosed within the case 32 if desired. The servo actuator 30 includes a speed reducing gear train with the output sector gear 36 shown through a breakaway in case 32 and the sector gear 36 is attached in driving engagement with an output hub 38 extending exteriorly of the case 32. It will be understood that the servo motor may be operated to position the output hub at any desired rotary position by suitable electrical output position feedback techniques known in the art for positioning valve member anywhere at and between fully open and fully closed positions.

Hub 38 has driving surfaces provided interiorly thereof as for example the flat surfaces denoted by reference numeral 40 and shown in dashed outline in FIG. 1.

A connector member 46 has an input hub 48 having complementary surfaces 50,52 provided thereon which surfaces interengage in driving arrangement with the surface 40 provided in the servo actuator output hub.

The connector 46 has a pair of radially extending spaced arms 54,56 extending therefrom in a common radial direction with the ends thereof having respectively flat surfaces 58,60 provided thereon and suitably spaced for being received over and contacting opposite sides of the crank pin 20. The arms 54,56 have a preferably rectangular cross section and upon rotation of the servo output hub 38 in a counterclockwise direction, connector member 46 is similarly rotated to cause the flat surface 60 to bear against crank pin 20 and rotate the valve 22 to the closed position against valve seat 28. Thereafter further continued rotation of the servo output hub 38 in the counterclockwise direction causes the arm 56 to be deflected in the manner of a cantilever beam loaded at its free end. The arm 56 thus absorbs the overtravel and thereby limits the force applied to crank pin 20 and the resulting torque on shaft 18 so as to prevent breakage of the weldment between the valve member 22 and shaft 18.

In the presently preferred practice of the invention, the connector 46 and arms 54,56 are molded integrally of a suitable plastic material having its flexural modulus relatively constant over the range of service temperatures encountered in vehicle engine compartment service. It has been found satisfactory in the present practice to use a polysulfone material in accordance with ASTM Standard D790 having a flexural modulus at 72 degrees F. (22 degrees C.) of 0.390 psi (2.69 GPa) and a flexural modulus not less than 0.320 psi (2.21 GPa) at 300 degrees F. (149 degrees C.). However, it will be understood that other plastic materials which similarly maintain their flexural modulus substantially constant over the temperature range −40 degrees F. to +250 degrees F. may also be employed.

In the presently preferred practice of the invention the cross sectional dimensions of the arm 56 at its root is designed according to cantilever beam stress theory well known in the art for materials having a substantially constant flexural modulus. For a rotation of the servo actuator output hub 38 an amount of subtending a central angle of four degrees beyond the closing position of the butterfly valve the arm 56 is designed so as not to apply more than 50 inch ounces (3.12 inch pounds) of torque to the crank pin 20.

The present invention thus provides a unique and novel low cost means for connecting a motorized servo actuator for controlling the opening and closing of a rotary valve suitable for automotive heater usage. The present invention has hereinabove been described with reference to the illustrated embodiment; however, it will be understood that the invention is capable of modification and variation and is limited only by the following claims.

We claim:

1. An over travel absorbing connection for a servo actuated valve comprising:
   (a) a valve having a fluid inlet and fluid outlet with a valve member disposed therein for pivotal movement between an open position permitting flow from said inlet to said outlet and a closed position blocking flow, and valve shaft means extending therefrom and rotatable for opening and closing said valve, said shaft means including drive means defining first and second drive surfaces operative to receive a driving torque thereon in opposite directions;
   (b) a motorized servo actuator having output shaft means for connection to valve shaft means, said output shaft means defining thereon third driving surfaces;
   (c) a connector formed of non-metallic material having complementary input surfaces engaging said output shaft means third surfaces, said connector having integrally formed therewith oppositely disposed resilient portions engaging respectively said first and second surfaces of said drive means, said resilient portions operative to absorb, by resilient deflection, further rotation of said output shaft means after said valve member reaches a limit position thereby limiting the torque applied to said valve shaft means.

2. The connection defined in claim 1, wherein said connector resilient portions includes a pair of spring arms extending outwardly therefrom each respectively engaging one of said first and second oppositely disposed crank means drive surfaces.

3. The connection defined in claim 1, wherein said crank means includes a crank pin offset from said input shaft means; and, said connector includes a hub and said resilient portion comprises a pair of spring arms extending from said hub, with said spring arms respectively contacting opposite sides of said crank pin.

4. The torque limiting connection defined in claim 1, wherein said connector includes a hub having said input surfaces formed externally thereon with said resilient portions comprising a pair of arms extending radially outwardly from said hub.

5. The connection defined in claim 1, wherein; said connector includes a hub having a pair of flats formed thereon for engaging said output shaft driving surfaces 6. The connection defined in claim 1, wherein said output shaft means driving surfaces includes a pair of internal flats formed therein and said connector complementary input surfaces comprise a pair of corresponding external flats on said input shaft means.

7. The connection defined in claim 1, wherein said servo actuator includes limit stop means for limiting the rotation of said output shaft means.

8. The connection defined in claim 1, wherein said connector resilient portions are formed of polyfulfone plastic material.

9. A torque limiting drive for a servo actuated valve comprising:
   (a) valve means having a fluid inlet and fluid outlet with a valve member disposed therein for pivotal movement between an open position permitting flow from said inlet to said outlet and a closed position blocking flow, said valve having valve shaft means extending therefrom and rotatable for opening and closing said valve member said shaft means including drive means defining first and second drive surfaces operative to receive a driving torque thereon in opposite directions;
   (b) a motorized servo actuator having output shaft means for connection to said valve shaft means, said output shaft means defining thereon third driving surfaces and disposed axially coincident with said valve shaft means;

(c) a connector formed of non-metallic material having complementary input surfaces engaging said output shaft means third driving surfaces, said connector having integrally formed therewith oppositely disposed resilient portions engaging respectively said first and second surfaces of said drive means, said resilient portions operative to absorb, by resilient deflection, further rotation of said output shaft means after said valve member reaches a limit positions thereby limiting the torque applied to said valve shaft means.

* * * * *